United States Patent
Gällstedt et al.

(10) Patent No.: US 12,281,444 B2
(45) Date of Patent: Apr. 22, 2025

(54) BARRIER COATING FOR PAPER AND PAPERBOARD

(71) Applicant: Stora Enso OYJ, Helsinki (FI)

(72) Inventors: Mikael Gällstedt, Stockholm (SE); Fredrik Wernersson Brodin, Kungsbacka (SE); Åsa Nyflott, Karlstad (SE)

(73) Assignee: Stora Enso OYJ, Helsinki (FI)

( * ) Notice: Subject to any disclaimer, the term of this patent is extended or adjusted under 35 U.S.C. 154(b) by 219 days.

(21) Appl. No.: 18/003,711

(22) PCT Filed: Jun. 18, 2021

(86) PCT No.: PCT/IB2021/055399
§ 371 (c)(1),
(2) Date: Dec. 29, 2022

(87) PCT Pub. No.: WO2022/003472
PCT Pub. Date: Jan. 6, 2022

(65) Prior Publication Data
US 2023/0235512 A1 Jul. 27, 2023

(30) Foreign Application Priority Data

Jun. 30, 2020 (SE) .................... 2050800-8

(51) Int. Cl.
| | | |
|---|---|---|
| *D21H 21/16* | (2006.01) | |
| *C09D 5/00* | (2006.01) | |
| *C09D 7/61* | (2018.01) | |
| *C09D 7/63* | (2018.01) | |
| *C09D 7/65* | (2018.01) | |
| *C09D 105/14* | (2006.01) | |
| *D21H 17/24* | (2006.01) | |
| *D21H 19/12* | (2006.01) | |
| *D21H 19/40* | (2006.01) | |
| *D21H 19/62* | (2006.01) | |

(52) U.S. Cl.
CPC .............. *D21H 21/16* (2013.01); *C09D 5/00* (2013.01); *C09D 7/61* (2018.01); *C09D 7/63* (2018.01); *C09D 7/65* (2018.01); *C09D 105/14* (2013.01); *D21H 17/24* (2013.01); *D21H 19/12* (2013.01); *D21H 19/40* (2013.01); *D21H 19/62* (2013.01)

(58) Field of Classification Search
CPC ........ D21H 21/16; D21H 19/12; D21H 19/40; D21H 19/62; D21H 19/10; D21H 17/24; D21H 17/72; D21H 19/36; D21H 19/54; D21H 27/10; D21H 19/00; C09D 5/00; C09D 7/61; C09D 7/63; C09D 7/65; C09D 105/14; C09D 101/00; C09D 103/00; C08J 2305/14; C08J 2479/02; C08J 5/18; B32B 29/00; B32B 2307/7244
See application file for complete search history.

(56) References Cited

U.S. PATENT DOCUMENTS

| | | | | |
|---|---|---|---|---|
| 5,089,307 A | * | 2/1992 | Ninomiya .......... | A22C 13/0013 426/138 |
| 2004/0129173 A1 | * | 7/2004 | Svensson ............... | C09D 5/008 106/144.1 |
| 2010/0129642 A1 | | 5/2010 | Gröndahl et al. | |
| 2012/0058536 A1 | * | 3/2012 | Ruda ..................... | C11D 3/227 525/54.23 |
| 2013/0127085 A1 | | 5/2013 | Kalbe et al. | |
| 2016/0122568 A1 | | 5/2016 | Catchmark et al. | |
| 2021/0362366 A1 | * | 11/2021 | Fogelström ............ | C09J 179/02 |

FOREIGN PATENT DOCUMENTS

| | | |
|---|---|---|
| CN | 103436572 A | 12/2013 |
| CN | 110055822 A | 7/2019 |
| EP | 1072657 A1 | 1/2001 |
| JP | 2003147276 A | 5/2003 |
| JP | 2010527384 A | 8/2010 |
| JP | 2013540848 A | 11/2013 |
| WO | 2004083286 A1 | 9/2004 |
| WO | 2012150904 A1 | 11/2012 |

OTHER PUBLICATIONS

International Search Report from corresponding PCT application No. PCT/IB2021/055399, mailed on Sep. 8, 2021.
Carla N. Schnell et al., Films from xylan/chitosan complexes: preparation and characterization, Cellulose (2017) 24:4393-4403, DOI 10.1007/s10570-017-1411-x.
Alfredo Escalante et al., Flexible oxygen barrier films from spruce xylan, Carbohydrate Polymers 87 (2012) 2381-2387.
Reza Faryar, Conversion of xylan into value-added products, Division of Biotechnology, Lund University, 2019.

* cited by examiner

*Primary Examiner* — John D Freeman
(74) *Attorney, Agent, or Firm* — Greer, Burns & Crain, Ltd.

(57) ABSTRACT

The present invention relates to an aqueous barrier coating composition comprising: 50-99.9% by weight of one or more anionic low molecular weight polysaccharide(s) having a degree of polymerization (DP) in the range of 2-12; 0.1-10% by weight of a polycationic polymer; based on the total dry weight of the aqueous barrier coating composition.

19 Claims, No Drawings

BARRIER COATING FOR PAPER AND PAPERBOARD

This application is a U.S. National Phase under 35 U.S.C. § 371 of International Application No. PCT/IB2021/055399 filed Jun. 18, 2021, which claims priority under 35 U.S.C. §§ 119 and 365 to Swedish Application No. 2050800-8 filed Jun. 30, 2020.

TECHNICAL FIELD

The present disclosure relates to coating compositions for coating of fiber-based substrates, such as paper or paperboard to improve their barrier properties, particularly oxygen and grease barrier properties. The disclosure further relates to fiber-based substrates coated with such coating compositions.

BACKGROUND

Effective gas, aroma, and/or moisture barriers are required in packaging industry for shielding sensitive products. Particularly, oxygen-sensitive products require an oxygen barrier to extend their shelf-life. Oxygen-sensitive products include many food products, but also pharmaceutical products and electronic industry products. Known packaging materials with oxygen barrier properties may be comprised of one or several polymer films or of a fiber-based substrate, e.g. paper or board, coated with one or several layers of an oxygen barrier polymer, usually as part of a multilayer coating structure.

Another important property for packaging for food products is resistance to grease and oil.

Barriers are normally created by coating the fiber-based substrate with a composition which gives the substrate barrier properties. Different coatings can be applied depending on the required barrier properties. The most commonly used materials when forming a barrier on a fiber-based substrate, are polyethylene (PE), polypropylene (PP), polyethylene terephthalate (PET), ethylene vinyl alcohol (EVOH) or ethylene vinyl acetate (EVA). EVOH is normally used in order to create oxygen barriers and PE or PET is normally used in order to create a liquid and/or vapor barrier. The polymers are normally either laminated or extrusion coated to the fiber-based substrate. However, a polymer layer that gives a product barrier properties normally needs to be relatively thick and it is thus quite costly to produce such barrier.

The most common way to approach reduction of oxygen transmission (OTR) through a paper or paperboard is to use multiple polymer layers. In this way, one layer can provide low OTR, whereas other layers can provide water repellency and/or low water vapor transmission rates.

Another commonly used barrier material is aluminum. Aluminum layers are typically used in order to improve the oxygen and light barrier of paper or paperboard products. The aluminum layers are thin, typically around 7-9 μm. Aluminum provides excellent barrier properties, but it significantly increases the carbon dioxide load of the product.

A problem with both polymer and aluminum layers is also that they decrease the biodegradability and the possibility to efficiently recycle the packaging materials.

There is a demand from producers, converters and end users to avoid the use of synthetic polymer and aluminum layers in paper or paperboard products in order to decrease the carbon dioxide load, and improve the biodegradability and recyclability of the products.

Therefore, there exists a need for improved processes for providing fiber-based substrates, such as paper or paperboard, with improved barrier properties.

DESCRIPTION OF THE INVENTION

It is an object of the present disclosure to provide a barrier film or coating for fiber-based substrates that alleviates at least some of the problems of prior art barrier films and coatings.

It is a further object of the present disclosure to provide a barrier film or coating for fiber-based substrates that provides good resistance to oxygen and/or grease.

It is a further object of the present disclosure to provide a barrier film or coating, which can be efficiently applied to fiber-based substrates using conventional coating methods.

Natural polymers from plants are biodegradable, renewable and recyclable and constitute an interesting source of raw materials for barrier films in packaging materials. Hemicelluloses are polysaccharides that are biosynthesized in a majority of plants, where they act as a matrix material present between the cellulose microfibrils and as a linkage between lignin and cellulose. Hemicelluloses have been commercially used as sweetening agents, thickeners and emulsifiers in food. It has previously been shown that barrier films formed from hemicellulose can provide good oxygen and grease barrier properties. However, such films can be difficult to manufacture efficiently as the high viscosities of hemicellulose compositions limit the solids content.

According to a first aspect illustrated herein, there is provided an aqueous barrier coating composition comprising:
  50-99.9% by weight of one or more anionic low molecular weight polysaccharide(s) having a degree of polymerization (DP) in the range of 2-12;
  0.1-10% by weight of a polycationic polymer;
  based on the total dry weight of the aqueous barrier coating composition.

The present invention is based on the surprising realization that short anionic polysaccharides, having a degree of polymerization (DP) in the range of 2-12, for example anionic hemicellulose such as xylan, can form good barrier films when combined with a polycationic polymer. Such low molecular weight polysaccharide, having a degree of polymerization (DP) in the range of 2-12, have not previously been considered for use in barrier films.

The inventors have found that in addition to providing barrier films and coatings having excellent oxygen and grease barrier properties, the combination of a relatively high amount of a low molecular weight polysaccharide and a relatively low amount of a polycationic polymer makes it possible to prepare aqueous barrier coating compositions with a high total solids content, such as at least 50% by weight, while still maintaining a reasonably low viscosity. This allows for the aqueous barrier coating composition to be efficiently applied to a substrate using conventional coating methods.

The aqueous barrier coating composition comprises the low molecular weight polysaccharide(s) having a degree of polymerization (DP) in the range of 2-12 and the polycationic polymer dissolved or dispersed in an aqueous medium. The aqueous medium may be water or an aqueous solution, or it may comprise a mixture of water or an aqueous solution with an organic solvent. In a preferred embodiment, the aqueous medium is water based, i.e., it is comprised of more than 50% by weight of water. In a more preferred embodiment, the aqueous medium is water.

The aqueous barrier coating composition can be a dilute or a high solids composition. However, a high solids composition is typically preferred.

An advantage of the inventive coating composition is that it allows high total solids content, such as 30% by weight or even higher, while still maintaining a reasonably low viscosity. The terms "total solids content" or "solids content" as used herein refer to the total fraction of dissolved solids plus suspended and settleable solids in an aqueous solution or suspension.

The high solids content combined with low viscosity reduces transportation costs of the coating composition and makes it possible prepare coatings with high basis weight in a single coating step. A high solids content also reduces the amount of water to be removed when the film or coating is dried, which can reduce the drying energy requirement of the coating process. Preferably, the total solids content of the coating composition is at least 10% by weight, more preferably at least 20%, or at least 30% by weight based on the total weight of the coating composition.

The total solids content of the coating composition is typically 90% by weight or less, preferably 80% by weight or less, more preferably 70% by weight or less, based on the total weight of the coating composition.

In some embodiments the aqueous barrier coating composition has a total solids content in the range 10-90% by weight, preferably in the range of 20-80% by weight, more preferably in the range of 30-70% by weight, based on the total weight of the coating composition.

The total solids content of the aqueous barrier coating composition comprises the one or more anionic low molecular weight polysaccharide(s) as its main component. The total solids content of the aqueous barrier coating composition comprises 50-99.9% by weight of one or more anionic low molecular weight polysaccharide(s).

In some embodiments, the aqueous barrier coating composition comprises 75-99% by weight of the one or more anionic low molecular weight polysaccharide(s) based on the total dry weight of the aqueous barrier coating composition.

The number of monosaccharide units in a polysaccharide is termed degree of polymerization (DP). The term low molecular weight polysaccharide(s) as used herein refers generally to a short saccharide chain comprised of 2-12 monosaccharide units. In some embodiments, the one or more low molecular weight polysaccharide(s) have a DP in the range of 2-8, preferably in the range of 2-7. This is a very short chain length, as compared to, for example, cellulose consisting of about 7,000-15,000 glucose molecules. The molecular weight of the low molecular weight polysaccharide(s) as used herein may typically be in the range of 250-2000 g/mol, such as in the range 250-1500 g/mol or in the range of 250-1000 g/mol.

The monosaccharide units can be the of the same type (a homo-polysaccharide) or different (a hetero-polysaccharide). The low molecular weight polysaccharide(s) can be natural prepared synthetically, e.g. by chemical or synthetic hydrolysis of a longer polysaccharide. Examples of anionic low molecular weight polysaccharides useful in the present invention include, but are not limited to, anionic low molecular weight polysaccharides of gellan, dextran, pullulan, cellulose, hemicellulose, hyaluronic acid, alginate, xanthan, zooglan, succinoglucan, and glucomannans.

The low molecular weight polysaccharide(s) are anionic, meaning that the low molecular weight polysaccharide(s) comprise at least one anionic functional group. The anionic functional group will typically be a carboxylate/carboxylic acid functional group, but other anionic functional groups are also possible. The anionic functional group(s) may be naturally occurring in the low molecular weight polysaccharide(s), such as carboxylate/carboxylic acid functional group in glucuronic acid or galacturonic acid, or introduced by chemical modification, e.g. oxidation or grafting of the low molecular weight polysaccharide(s).

In some embodiments, the one or more low molecular weight polysaccharide(s) having a degree of polymerization (DP) in the range of 2-12 is selected from the group consisting of an anionic hemicellulose, an anionic cellulose and an anionic starch, or combinations thereof.

In some embodiments, the one or more low molecular weight polysaccharide(s) having a degree of polymerization (DP) in the range of 2-12 is an anionic hemicellulose.

Hemicelluloses are substituted/branched polysaccharides ranging from low to high molecular weight. They consist of different sugar units arranged in different portions and with different substituents.

Hemicelluloses can be divided into the main groups of xylans, xyloglucans, glucomannans, and mixed linkage beta-glucans. Some of the hemicelluloses naturally carry a negative charge due to the presence of glucuronic acid and/or galacturonic acid units in the saccharide chain. The hemicellulose for use in the aqueous barrier coating composition are preferably such anionic hemicelluloses. Hemicelluloses are easily hydrolyzed by dilute acid or base as well as various hemicellulase enzymes.

In some embodiments, the one or more low molecular weight polysaccharide(s) having a degree of polymerization (DP) in the range of 2-12 is xylan. Xylans are present in biomass such as wood, cereals, grass and herbs and they are considered to be the second most abundant biopolymer in the plant kingdom. To separate xylans from other components in various sources of biomass, extraction with water and aqueous alkali can be used.

The total solids content of the aqueous barrier coating composition further comprises 0.1-10% by weight of a polycationic polymer. In some embodiments, the aqueous barrier coating composition comprises 0.5-6% by weight of the polycationic polymer based on the total dry weight of the aqueous barrier coating composition.

The polycationic polymer is a synthetic or natural polymer having a plurality of cationic functional groups. Examples of polycationic polymers for use in the present invention are selected from the group consisting of poly(N-methylvinylamine), polyallylamine, polyallyldimethylamine, polydiallylmethylamine, polydiallyldimethylammonium chloride (pDADMAC), polydiallyldimethylammonium trifluoromethanesulfonate (pDADMAT), polydiallyldimethylammonium nitrate (pDADMAN), polydiallyldimethylammonium perchlorate (pDADMAP), polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethyaminoethylmethacrylate), polyethyleneimine, polylysine, DAB-Am and PAMAM dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl-N, N, N-trimethylammonium chloride, bis(trimethoxysilylpropyl)amine, chitosan, cationic starch, cationic gelatin, the product of alkylation of polyethyleneimine by methylchloride, the product of alkylation of polyaminoamides with epichlorohydrine, cationic polyacrylamide with cationic monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amidopropyl trimethyl ammonium chloride (MAPTAC), diallyl dimethyl ammonium chloride (DADMAC), ionenes, silanes and mixtures thereof.

In some embodiments, the cationic polymers are selected from the group consisting of: polyaminoamides, polyethyleneimine, polyvinylamine, polydiallyldimethylammonium chloride (pDADMAC), chitosan, cationic starch, and cationic gelatin.

In preferred embodiments, the polycationic polymer is a polyethyleneimine (PEI).

In some embodiments, the polycationic polymer has a weight average molecular weight in the range of 2,000-1,000,000 g/mol, preferably in the range of 10,000-100,000 g/mol.

The formulation of the aqueous barrier coating composition may vary greatly depending on the intended use of the coating and the coated substrate. In some embodiments, the total solids content of the aqueous barrier coating composition consists solely of the one or more low molecular weight polysaccharide(s) and the polycationic polymer. In other embodiments, the coating composition may further include a wide range of ingredients in varying quantities to improve the end performance of the product or processing of the coating.

In some embodiments, a plasticizer is added to the aqueous barrier coating composition to increase the elasticity of the resulting films or coatings and make them less brittle. This allows the formed films or coatings to better withstand bending without losing their barrier properties.

In some embodiments, the aqueous barrier coating composition comprises 1-10% by weight of a plasticizer based on the total dry weight of the aqueous barrier coating composition.

In some embodiments, the plasticizer is selected from the group consisting of glycerol, xylitol, sorbitol, maltitol, ethylene glycol, propylene glycol, butanediol, and combinations thereof.

In some embodiments a filler is added to the aqueous barrier coating composition to improve the barrier properties and the mechanical properties of the resulting films or coatings.

In some embodiments, the aqueous barrier coating composition further comprises 5-40% by weight of a filler based on the total dry weight of the aqueous barrier coating composition.

In some embodiments, the filler is selected from the group consisting of clay (such as kaolin or calcined kaolin), talcum, $CaCO_3$ (such as PCC or GCC), $TiO_2$, $Al_2O_3$, $SiO_2$, bentonite, fibers, or a mixture thereof. The fibers may preferably be any fiber having a hydrophilic surface and a having a density close to the density of water, i.e. preferably in the range of 0.85-1.15 $g/cm^3$ or in the range of 0.90-1.10 $g/cm^3$.

In some embodiments, the filler is selected from the group consisting of clay, talcum, $CaCO_3$, and fibers, or combinations thereof.

The coating composition is preferably provided in a formulation suitable for application to paper or paperboard using conventional paper coating equipment and techniques, such blade coaters and bar coaters. Accordingly, the coating composition may include various additives to impart suitable coating characteristics. Such coating additives may include, but are not limited to, a dispersing agent (e.g. a surfactant), a lubricant (e.g. a stearate), a rheology modifier, an insolubilizer, a humectant, a barrier chemical, and a pH adjusting agent (e.g. NaOH).

The aqueous barrier coating composition can be applied to a substrate and dried to form a barrier film or coating. Thus, according to a second aspect illustrated herein, there is provided a barrier film or coating comprising:

50-99.9% by weight of one or more anionic low molecular weight polysaccharide(s) having a degree of polymerization (DP) in the range of 2-12;

0.1-10% by weight of a polycationic polymer;

based on the total dry weight of the barrier film or coating.

The barrier film or coating is preferably dry or substantially dry. The barrier film or coating preferably has a total solids content above 90% by weight, preferably above 95% by weight.

It is understood that the composition of the barrier film or coating according to the second aspect will correspond to the composition of the total solids content of the aqueous barrier coating composition according to the first aspect. For example a dry content of 50-99.9% by weight of the one or more anionic low molecular weight polysaccharide(s) in the aqueous barrier coating composition results in a content of 50-99.9% by weight of the one or more anionic low molecular weight polysaccharide(s) in the dry barrier film or coating.

The film or coating according to the invention may generally have a basis weight of 30 $g/m^2$ or less. Typically, a basis weight of at least 1 $g/m^2$ is required to obtain acceptable barrier properties. In some embodiments, the basis weight of the film or coating is in the range of 5-15 $g/m^2$, preferably in the range of 5-10 $g/m^2$.

The film or coating according to the invention may generally have a thickness of 100 μm or less. In particular, the film or coating may have a thickness of 50 μm or less, or more specifically the film or coating may have a thickness of 15 μm or less or 10 μm or less. In some embodiments, the thickness of the film or coating is in the range of 1-15 μm, preferably in the range of 5-10 μm.

The barrier film or coating is preferably prepared from an aqueous barrier coating composition as described above with reference to the first aspect.

The inventive barrier film or coating has good oxygen and grease barrier properties.

In some embodiments, the film or coating has an oxygen transmission rate (OTR), measured according to the standard ASTM D-3985 at 50% relative humidity and 23° C., of less than 100 $cc/m^2/24$ h/atm, preferably less than 50 $cc/m^2/24$ h/atm, and more preferably less than 10 $cc/m^2/24$ h/atm.

In some embodiments, the film or coating has a KIT value above 8, preferably above 10, as measured according to standard TAPPI T559.

According to a third aspect illustrated herein, there is provided a coated substrate comprising a substrate coated with an aqueous barrier coating composition according to the first aspect.

The aqueous barrier coating composition according to the first aspect is of particular interest for coating of fiber-based substrates. Thus, in some embodiments, the coated substrate is a fiber-based substrate. The fiber-based substrate is preferably a paper or paperboard.

Paper generally refers to a material manufactured in sheets or rolls from the pulp of wood or other fibrous substances comprising cellulose fibers, used for e.g. writing, drawing, or printing on, or as packaging material. Paper can either be bleached or unbleached, coated or uncoated, and produced in a variety of thicknesses, depending on the end-use requirements.

Paperboard generally refers to strong, thick paper or cardboard comprising cellulose fibers used for example as flat substrates, trays, boxes and/or other types of packaging.

Paperboard can either be bleached or unbleached, coated or uncoated, and produced in a variety of thicknesses, depending on the end-use requirements.

The aqueous barrier coating composition can either be added on the papermaking machine (on-machine coating) or on a separate machine (off-machine coating). A variety of paper coating equipment and techniques may be used for applying the coating composition, for example blade coaters, air knife coaters, and cast coaters. The coating composition can be applied to one side or both sides of the paper or paperboard.

The surface of the paper or paperboard on which the aqueous barrier coating is to be applied may preferably be pre-treated, e.g. by dispersion coating mineral coating, to decrease the porosity of the surface. This way the amount of the aqueous barrier coating can be reduced. Thus, in some embodiments, coated substrate is a dispersion coated, preferably mineral coated, paper or paperboard.

The coated substrate is preferably suitable for being repulped. In some embodiments, the coated substrate has a repulpability characterized by a reject rate (as determined according to the PTS RH 021/97 test method) below 20%, preferably below 10%, more preferably below 5%, and most preferably below 1%.

According to a fourth aspect illustrated herein, there is provided a method for the manufacture of a barrier film or coating, comprising:
a) preparing an aqueous barrier coating composition according to the first aspect;
b) forming a wet film or coating of the aqueous barrier coating composition; and
c) drying the wet film or coating to obtain the barrier film or coating.

In some embodiments the aqueous barrier coating composition has a total solids content in the range 10-90% by weight, preferably in the range of 20-80% by weight, more preferably in the range of 30-70% by weight, based on the total weight of the coating composition.

In the drying step c), the total solids content of the wet film or coating is increased by evaporation of water. The resulting barrier film or coating preferably has a total solids content above 90% by weight.

In some embodiments, the basis weight of the dried barrier film or coating is in the range of 5-15 $g/m^2$, preferably in the range of 5-10 $g/m^2$.

In some embodiments, the thickness of the dried barrier film or coating is in the range of 5-15 μm, preferably in the range of 5-10 μm.

The term coating as used herein refers generally to a finishing operation in which the surface of a substrate, e.g. a fiber-based substrate such as a paper or paperboard, is covered with a composition to impart a desired finish or texture to the substrate or to improve its printability or other properties, such as optical or barrier properties. The term barrier coating as used herein refers generally to a coating designed to impart improved barrier properties to the substrate.

The term film as used herein refers generally to a thin continuous sheet formed material. The term barrier film as used herein refers generally to a film designed to provide good barrier properties.

Generally, while the products, polymers, materials, layers and processes are described in terms of "comprising" various components or steps, the products, polymers, materials, layers and processes can also "consist essentially of" or "consist of" the various components and steps.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Materials:
Dried Xylan powder, DP 2-7, 95% purity, 8% moisture content (Coreychem)
Glycerol, 87% concentration in water (Merck)
Clay, 72% concentration in water (Omya)
PEI, 50% by weight concentration in water (Sigma Aldrich)

Example 1—Preparation of Xylan/Water Mixtures

A 20% xylan mixture was prepared by gradually adding 20 g of xylan powder into a stirred vessel containing 80 g of water. The mixture had a very low viscosity of about 16 LmPa (Brookfield viscosity of 19% solution, spindle 2, at 21° C.).

47%, 51% and 53% xylan mixtures were prepared by gradually adding 47 g, 51 g and 53 g of xylan powder into stirred vessels containing 53 g, 49 g and 47 g of water, respectively. The mixtures had medium viscosity level of about 16 LmPa (Brookfield viscosity of 39% solution, spindle 2, at 21° C.) suitable for rod coating.

Example 2—Preparation of Coating Colors

Xylan-based coating colors with different chemical composition were prepared at room temperature by mixing xylan and additives (glycerol, clay and PEI) as set out in Table 1.

Example 3—Coating of Paperboard

The coating colors were applied onto the surface of a paperboard substrate (Tam brite 200 gsm, print coated) using a laboratory rod coater equipped with IR-drying. All samples were coated 2 times with a grooved rod (red). The samples were conditioned in 23° C. and 50% RH for several days before being analyzed.

Analyses

The samples were tested for occurrence of pinholes, grease resistance (KIT) and oxygen permeability (oxygen transmission rate, OTR), as follows:
The oxygen transfer rate (OTR) was measured in accordance with ASTM D3985, at a temperature of 23° C. and at 50% relative humidity (RH).
The number of pinholes is measured in accordance with EN13676:2001. The measurement involves treating the packaging material with a coloring solution (e.g. dyestuff E131 Blue in ethanol) and inspecting the surface microscopically.
The KIT value is a measure of the grease resistance and is measured in accordance with TAPPI T559.
The results of the analyses are presented in Table 1.

TABLE 1

| ID | Xylan | Glycerol | Clay | PEI | Coating color (dry content) | Coat weight (g/m²) | Pinholes | KIT | OTR (cm³/m²) |
|---|---|---|---|---|---|---|---|---|---|
| 4 | 100%[1] | — | — | — | 47% | 15.46 | 1 | 12 | OR[5] |
| 13 | 70%[1] | 30% | — | — | 59% | 21.55 | — | 1 | — |
| 15 | 80%[1] | 20% | — | — | 55% | 26.48 | — | 1 | — |
| 26 | 95%[1] | — | — | 5% | 47% | — | 2 | 5 | — |
| 36 | 91%[2] | 4% | — | 5% | 52% | 13.16* | 0 | 12 | 2677.4 |
| 38 | 90%[2] | 5% | — | 5% | 53% | 8.22* | 0 | 12 | 2878.6 |
| 48 | 96%[2] | 4% | — | — | 52% | 13.16 | 0 | 12 | OR[5] |
| 52 | 75%[3] | — | 25% | — | 58% | 15.13 | 1 | 12 | — |
| 54 | 71%[3] | 4% | 25% | — | 59% | 14.64 | 1 | 9 | 3996.8 |
| 60 | 66%[3] | 4% | 25% | 5% | 59% | 8.22* | 0 | 12 | 1.7 |

[1]Prepared from 47% xylan mixture
[2]Prepared from 51% xylan mixture
[3]Prepared from 53% xylan mixture
[5]OR = out of range meaning value is >5000 cm³/m²

The invention claimed is:

1. An aqueous barrier coating composition comprising:
   50-99.9% by weight of one or more anionic low molecular weight polysaccharides(s) having a degree of polymerization (DP) in a range of 2-12; and,
   0.1-10% by weight of a polycationic polymer;
   the weights based on a total dry weight of the aqueous barrier coating composition.

2. The aqueous barrier coating composition according to claim 1, comprising 75-99% by weight of the one or more anionic low molecular weight polysaccharides.

3. The aqueous barrier coating composition according to claim 1, wherein the one or more low molecular weight polysaccharides are selected from a group consisting of: an anionic hemicellulose, an anionic cellulose, an anionic starch, and combinations thereof.

4. The aqueous barrier coating composition according to claim 1, wherein the one or more low molecular weight polysaccharides comprises an anionic hemicellulose.

5. The aqueous barrier coating composition according to claim 1, wherein the one or more low molecular weight polysaccharides comprises xylan.

6. The aqueous barrier coating composition according to claim 1, wherein the one or more low molecular weight polysaccharides have a DP in a range of 2-8.

7. The aqueous barrier coating composition according to claim 1, further comprising 0.5-6% by weight of the polycationic polymer.

8. The aqueous barrier coating composition according to claim 7, wherein the polycationic polymer comprises a polyethyleneimine (PEI).

9. The aqueous barrier coating composition according to claim 7, wherein the polycationic polymer has a weight average molecular weight in a range of 2,000 to 1,000,000 g/mol.

10. The aqueous barrier coating composition according to claim 1, further comprising:
    1-10% by weight of a plasticizer.

11. The aqueous barrier coating composition according to claim 10, wherein the plasticizer is selected from a group consisting of: glycerol, xylitol, sorbitol, maltitol, ethylene glycol, propylene glycol, butanediol, and combinations thereof.

12. The aqueous barrier coating composition according to claim 1, further comprising 5-40% by weight of a filler.

13. The aqueous barrier coating composition according to claim 12, wherein the filler is selected from a group consisting of: clay, talcum, $CaCO_3$, fibers, and combinations thereof.

14. A barrier film or coating comprising:
    50-99.9% by weight of one or more anionic low molecular weight polysaccharides having a degree of polymerization (DP) in a range of 2-12;
    0.1-10% by weight of a polycationic polymer;
    the weights based on a total dry weight of the barrier film or coating.

15. The barrier film or coating according to claim 14, wherein a basis weight of the film or coating is in a range of 5-15 g/m².

16. A coated substrate comprising:
    a substrate coated with the aqueous barrier coating composition according to claim 1.

17. The coated substrate according to claim 16, wherein the coated substrate is a fiber-based substrate.

18. The coated substrate according to claim 16, wherein said coated substrate has a repulpability characterized by a reject rate (as determined according to the PTS RH 021/97 test method) below 20%.

19. A method for the manufacture of a barrier film or coating, comprising:
    a) preparing the aqueous barrier coating composition according to claim 1;
    b) forming a wet film or coating of the aqueous barrier coating composition; and
    c) drying the wet film or coating to obtain the barrier film or coating.

* * * * *